No. 870,416.
PATENTED NOV. 5, 1907.
W. H. CLEGG.
MEASURING AND MARKING MOTION FOR USE IN CONNECTION WITH YARN SIZING AND SIMILAR MACHINES.
APPLICATION FILED MAR. 10, 1906.
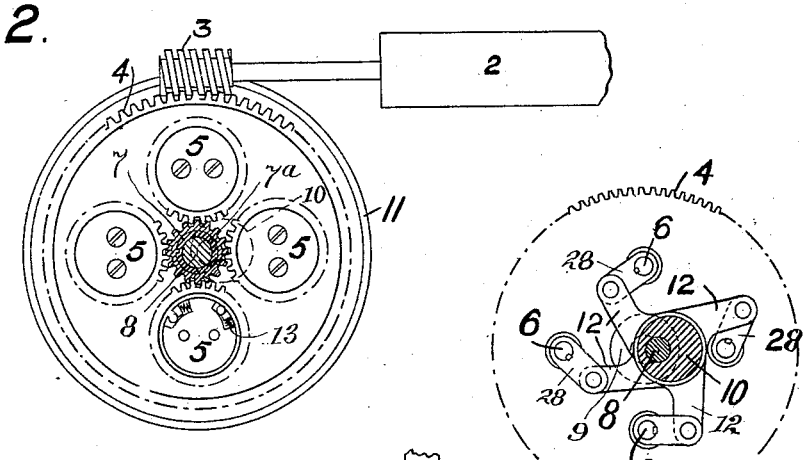
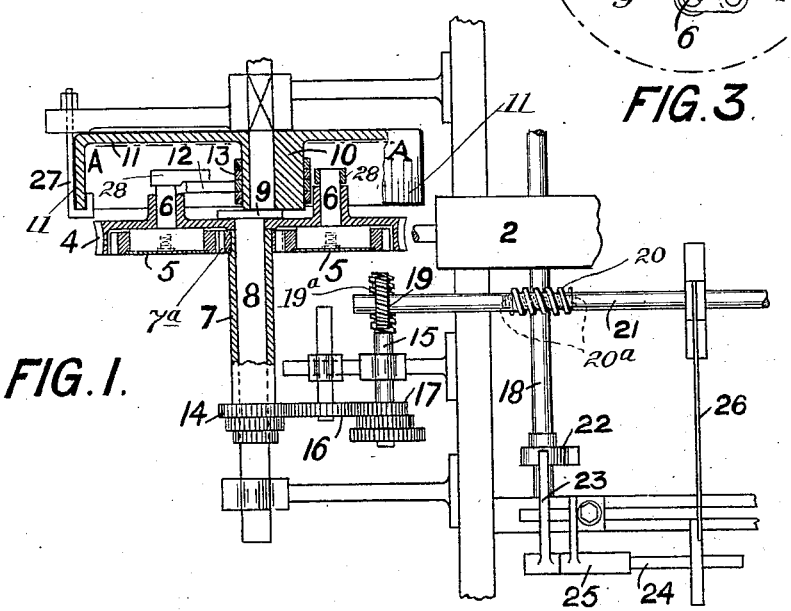
Witnesses
Inventor:
William Henry Clegg,
by Dodge and Sons,
Associate Attys.

UNITED STATES PATENT OFFICE.

WILLIAM HENRY CLEGG, OF BURNLEY, ENGLAND.

MEASURING AND MARKING MOTION FOR USE IN CONNECTION WITH YARN-SIZING AND SIMILAR MACHINES.

No. 870,416.

Specification of Letters Patent.

Patented Nov. 5, 1907.

Application filed March 10, 1906. Serial No. 305,396.

*To all whom it may concern:*

Be it known that I, WILLIAM HENRY CLEGG, a subject of the King of Great Britain, residing in Burnley, in the county of Lancaster, in the Kingdom of England, engineer, have invented certain new and useful Improvements in Measuring and Marking Motion for Use in Connection with Yarn-Sizing and Similar Machines, for which application has been made in Great Britain, No. 7,433, dated April 8, 1905.

This invention relates to mechanism and means for measuring and marking the yarn as it passes from yarn sizing and similar machines, and the object of the invention is to make a combination of mechanisms which will measure and mark the yarn to any length required without the use of numerous change wheels.

In order that the invention may be fully understood reference will now be had to the accompanying drawings, in which:—

Figure 1 is a plan view in partial section of the device, while Fig. 2 is a side view of a portion of the device partly in section. Fig. 3 is a detail sectional view on the line A—A of Fig. 1.

In carrying out the invention the measuring device is actuated in a known way by means of a roller 2 over which the material to be marked passes. This roller 2 gears with a differential gear preferably by means of a worm 3 and worm wheel 4. This worm wheel 4 has mounted in it a plurality of pinions 5 by means of shafts 6 which mesh with a gear or pinion $7^a$ on a sleeve 7 mounted on a central shaft 8. The worm wheel 4 is mounted on the inner end of shaft 8. Said shaft 8 is provided with an eccentric part 9 on which eccentric part an eccentric 10 is mounted. Mounted upon the periphery of the eccentric 10 is an index-plate 11, indicated in Fig. 1. The eccentricity of the eccentric 10 is such that when mounted on the eccentric part 9 of the shaft 8 its center is capable of being brought into coincidence with the center of the shaft 8. Connected to the small shafts 6 of the pinions 5 are a series of cranks 28 and eccentric rods 12 which embrace the eccentric 10. The small shafts 6 of the pinions 5 are connected to the pinions so that the latter have a free wheel motion in one direction by means of suitable clutch devices such as a spring pressed roller and slot, as shown at 13, Fig. 2.

The sleeve 7 carries a series of change gears 14 that mesh with a gear 16 which in turn meshes with a series of change gears 17 mounted upon a shaft 15. Said shaft is provided with a worm $19^a$ which in turn meshes with a worm-wheel 19, mounted upon a shaft 21. This shaft 21 carries a worm 20, the latter meshing with a worm-wheel $20^a$ mounted upon a shaft 18. Said shaft carries a cam 22 which serves to actuate a trip-lever 23, carried at one end of a cross-shaft 24, which latter is mounted in a bearing 25. To the opposite end of the shaft 24 is connected a marker 26.

The operation of the device is as follows:—The rotation of the roller 2 operates the worm wheel 4, which in turn by means of the pinions 5 and $7^a$ rotates the sleeve 7, which by means of the pinion 14, gear 16, 17, and parts 15, 19, 21, 20 and 18 rotate the cam 22, which at every rotation trips the device 23 and so turns the shaft 24, and causes the marker 26 to mark the cloth. The latter part of the device from the pinion 14 up to the marker can be arranged in any suitable manner to suit different machines. As will be readily appreciated, the shifting of the eccentric 10 will vary the relation of the parts and as a consequence vary the period of operation of the marker hereinafter referred to. By the use of an index-plate, as 11, the operator may readily ascertain the position of the parts and thus determine the period in which the marker will operate. As will be seen, if the eccentric 10 be turned on the eccentric part 9 of the shaft 8 so as to be eccentric with the center of the worm wheel 4, the eccentric rods 12 and cranks 28 will cause the shafts 6 to oscillate, and so by means of the free wheel motion urge the pinions 5 round intermittently in one direction, so that the sleeve 7 with which the gear will be caused to move in advance of the worm wheel 4, so that great nicety of regulations a to speed can be given to the sleeve 7.

27 denotes a combined clamp and indicator, said device being secured in a fixed portion of the machine and, as shown in Fig. 1, embracing the peripheral portion of the eccentric member 10 upon the outer face of which member, as hereinbefore stated, the index-plate 11 is arranged. The peripheral portion of the eccentric 10, with the index-plate thereon, is moved under the indicator 27 when the same is loosened, so as to obtain the necessary adjustment of the parts to cause the marks to be made on the cloth at the desired points. When the parts are adjusted, the member 27 is drawn up tight so as to hold the eccentric in its adjusted position.

The reason for the change wheels 16, 17, which are not necessary where only small variations in the distances apart of the marks on the cloth are desired, is to make it possible to arrange for large variations between the distances of the marks on the cloth.

I declare that what I claim is:—

1. In a marking machine for yarn or cloth, a roller over which the cloth passes, adjustable differential gearing driven from said roller, and a marking device driven from said differential gearing.

2. In a machine for marking cloth or the like, a roller over which the cloth passes; a wheel driven from said roller; a series of shafts carried by said wheel; a pinion mounted upon each of said shafts; a crank connected to one end of each of said shafts; means for actuating said cranks as said wheel is rotated and thereby causing the pinions to rotate; a rotatable member driven by said pinions; a marking device; and a driving connection intermediate said marking device and said rotatable member.

3. In a marking machine for cloth or the like, a roller over which the cloth to be marked passes; a wheel driven from said roller; a shaft to which said wheel is secured; a sleeve mounted upon said shaft; a series of pinions carried by the wheel and gearing with the sleeve; means for rotating said pinions; means for varying the relative speeds of rotation of said pinions and the wheel; a marking device; and connections between said sleeve and marking device.

4. In a marking machine for cloth or the like, a roller over which the cloth to be marked passes; a wheel driven from said roller; a shaft carrying the wheel, said shaft being provided with an eccentric portion; an eccentric member mounted upon said eccentric portion; a series of shafts carried by said wheel; a pinion mounted upon each of said shafts; a crank carried by each of said shafts; connections between the outer ends of said cranks and the eccentric member; a rotatable member driven by the pinions; a marking device; and actuating connections between said marking device and the rotatable member.

5. In a marking machine for cloth or the like, a roller over which the cloth to be marked passes; a wheel driven from said roller; a shaft upon which said wheel is carried; a sleeve loosely mounted upon said shaft; a series of shafts carried by the wheel; a pinion for each of said shafts; a clutch device between each of said shafts and its pinion; means for actuating said shafts; means for adjusting the actuating means; driving connections between the sleeve and the pinions; a marking device; and actuating means intermediate said marking device and the sleeve.

6. In a marking machine for cloth or the like, a roller over which the cloth to be marked passes; a wheel driven from said roller; a shaft carrying said wheel; a sleeve on the shaft; differential gearing between said wheel and sleeve; and a marking device actuated by said sleeve.

7. In a marking machine for cloth or the like, a roller over which the cloth to be marked passes; a wheel driven from said roller; a shaft carrying said wheel, the shaft being provided with an eccentric extension; a sleeve mounted on the shaft; a series of shafts carried by the wheel; a pinion mounted upon each of said shafts, the pinions meshing with the sleeve; a clutch mechanism between each of said pinions and its shaft; cranks connected to the shafts; an adjustable eccentric member mounted upon the eccentric portion of the first-named shaft; eccentric rods connecting the cranks to said eccentric member; means for securing said eccentric member in its adjusted position; a marking device; and driving connections intermediate said marking device and the sleeve.

8. In a machine for marking cloth or the like, a roller over which the cloth to be marked passes; a worm-wheel driven from said roller; a series of shafts carried by said wheel and arranged equidistantly from the center of said wheel; a pinion adjustably mounted upon each of said shafts; a crank connected to the opposite end of each of said shafts; an adjustable eccentric; eccentric rods connected to the cranks and to said adjustable eccentric; an index-plate for said eccentric; means for securing said eccentric in its adjusted position; a rotatable member driven by the pinions; and a marking device actuated by said rotatable member.

In witness whereof, I have hereunto signed my name this 24th day of February 1906, in the presence of two subscribing witnesses.

WILLIAM HENRY CLEGG.

Witnesses:
HUBERT PUMPHREY,
JOHN J. LEARY.